Patented Nov. 7, 1933

1,933,573

UNITED STATES PATENT OFFICE 1,933,573

ART OF APPLYING THE GUM HYDROCARBONS

Felix F. von Wilmowsky, New York, N. Y.

No Drawing. Application March 11, 1929, Serial No. 346,247. Renewed April 22, 1933

4 Claims. (Cl. 99—12)

My invention relates to the gum hydrocarbons generally and among the same, in particular, to such gum hydrocarbons as the hydrocarbons characteristic of the Sapotaceæ gums are; the latter having been defined in my specification filed in the United States Patent Office on March 22, 1924— Serial No. 701,217—, of which the present specification is a continuation-in-part.

I have found a new process of curing elastic gums as well as pure gum hydrocarbons at a moderate temperature with sulphur "in statu nascendi", that is to say, under circumstances where the sulphur is active. My process consists in impregnating at a low temperature the sheeted or precipitated gum hydrocarbons, pure or in the condition of elastic gums and either in a solid state or in solution or emulsion, with monosulphide of hydrogen, and then under exclusion of light exposing the impregnated gum hydrocarbons to a source of nascent or active oxygen containing no sulphur such as ozone in a current of an inert gas such as carbonic acid; the ozone combines with the hydrogen of the moist sulphide, forming water, and sets "nascent" or active sulphur free; the combination of hydrogen and oxygen sets heat free. Slight quantities of sulphuric acid may appear, which result from the reaction; they are neutralized by adding a slight quantity, say, one half to three quarters of one per cent., of some suitable basic oxide such as zinc oxide. This process is less fitted for the less hard and tenacious gum hydrocarbons in a pure state, and still less for such pure gum hydrocarbons as the hydrocarbons characteristic of the softer caoutchoucs are, which are more apt to combine with active oxygen in the presence of water. An excess of active oxygen must be carefully avoided; there must under all circumstances be an excess of the hydrogen sulphide. For instance: If I want to cure 100 parts of gum hydrocarbons with about one half part, by weight, of sulphur, I impregnate the gum hydrocarbons gradually at a low temperature with what amounts to somewhat more than one part, by weight, of pure monosulphide of hydrogen; I chill the impregnated sheeted or dissolved gum hydrocarbon and monosulphide mixture and then gradually and at a low temperature introduce the active oxygen, but only so much of it as will seize the hydrogen molecules combined with not much more than one third of the available sulphide.

The varnishes consisting of resin have generally the disadvantage that they are apt to crack. I have found that the solutions of the mildly-cured gum hydrocarbons, such as the gum hydrocarbons characteristic of the Sapotaceæ gums are, make, evaporated, varnishes of superior tenacity and smoothness, not liable to crack. I take a mildly cured gum hydrocarbon solution prepared as has been described in my specification filed on March 22, 1924 (informally filed on March 24, 1923)—Serial No. 701,217—and concentrate the same suitably so as to spread readily and evenly upon metal or cellulose or casein or some fibrous tissue such as leather or cloth or paper or other fibrous or felted matters; or I dissolve such cured or vulcanized gum hydrocarbons, if the same be in a solid state, in a suitable fluid such as volatile petroleum hydrocarbons by applying to the cured or vulcanized gum hydrocarbons pressure or heat or both combined. I speak here of mild-cured gum hydrocarbons in distinction from the hard-cured gum hydrocarbons which generally contain high percentages of uncombined sulphur. I prepare the solutions of mildly cured or mildly vulcanized gum hydrocarbons of the above said characteristics by letting first the comminuted or shredded mildly cured gum hydrocarbons soak for awhile— say, 24 hours—in suitably volatile petroleum hydrocarbons, and then remove the mass and heat it with a comparatively small quantity of some suitable solvent, preferably volatile petroleum hydrocarbons, in a closed digester at a temperature of preferably not more than 130 degrees centigrade, keeping the pressure in the digester sufficiently high to prevent boiling of the solvent. If the solution is to be highly concentrated, I take less solvent and increase the temperature a few degrees, and with it the pressure. After a while the cured hydrocarbon gum under the influence of heat and pressure, if necessary to save time, combined, undecomposed—and if there was uncombined sulphur, now perfectly vulcanized, has dissolved. The solutions of cured hydrocarbon gums in volatile petroleum hydrocarbons prepared as herein above set forth, can be suitably concentrated by evaporation and again be diluted under suitable heat and pressure without being decomposed. The solutions, if no "oils" are present, can be used dilute for various purposes, not only as a quick-drying varnish as has been said herein above, or as a cement, but can also, if highly concentrated be solidified into sheets or casts; if a kerosene or heavier petroleum hydrocarbons have been employed, the mildly cured gum hydrocarbon solution can be used to give "body" to the oil, where that is desired.

Attempts have heretofore been made to toughen fibrous substances such as wood and textile tissues, felting and paper, by impregnating the same with various matters, among the same with mixtures of vulcanized rubber or rubber composition and resin dissolved in drying oils such as boiled linseed-oil or castor oil. Such solvents produce rapid destruction of the rubber through oxidation and instead of toughening and prolonging the life of the fibrous matters render the same resinous and brittle and apt to quickly decay. My invention aims at removal of all resin and other substances which either render the fibrous matter more brittle as resins do, or act as oxygen-carriers; I exclude all solvents of the gum hydrocarbons which are oxygen compounds such as fats, drying oils, and also the natural elastic gums such as resinous rubber and gutta percha. I employ only the gum hydrocarbons, which in the natural elastic gums are mixed with resin.

I utilize the suitably dilute mildly cured or mildly vulcanized solution of the tenacious gum hydrocarbons free of uncombined sulphur and prepared according to my methods set forth in my specification filed on March 22, 1924—Serial No. 701,217—for the impregnation of fibrous or felted matter such as wood or paper and fibrous or felted tissues such as matting and cloth so as to increase permanently or restore the cohesive and bending and tensile strength of the fibres and the tenacity especially of the wood. If the mild-cured gum hydrocarbons are in a solid state, they are dissolved in a suitable hydrocarbon fluid such as volatile petroleum hydrocarbons by applying to the cured or vulcanized gum hydrocarbons pressure or heat or both combined. By "mildly cured or mildly vulcanized gum hydrocarbons" I understand gum hydrocarbons combined with only a few per cent—about two or three per cent—of sulphur. I distinguish the same from the "vulcanized" and the "hard-cured" elastic gums, which always contain some resin and generally contain substantial percentages of uncombined sulphur. Before the treatment of the fibres or tissues I extract from the matter to be treated the resinous and fatty and oily substances and the starch with superheated steam and with hot volatile petroleum hydrocarbons or by other well known methods which do not weaken the fibres or if left with the same, affect deleteriously the gum hydrocarbons. I impregnate, using suitably strong pressure and suction, the wood or tissues left porous with a suitably dilute volatile petroleum hydrocarbon solution of either the pure tenacious gum hydrocarbons or the mildly cured or vulcanized tenacious gum hydrocarbons free of uncombined sulphur, and then evaporate the petroleum hydrocarbons in a vacuum at a suitable temperature below the one at which the gum hydrocarbons coalesce, then at the coalescing temperature, avoiding higher temperatures. The degree of dilution suitable depends on the character of the gum hydrocarbons as well as on that of the material to be treated; while it must be ample in all cases for the purposes here involved as is known, the caoutchouc gum hydrocarbons require a much higher degree of dilution than, e. g., the chicle gum hydrocarbons in order to be amenable to the process here described. The temperature at which the different gum hydrocarbons assume a hard condition in volatile petroleum hydrocarbons differs from about plus 10 degrees centigrade for gutta percha gum hydrocarbons to about minus 80 degrees centigrade for some of the caoutchouc gum hydrocarbons. My preferred solvents are petroleum ether and rhigolene, which latter is a mixture of petroleum hydrocarbons of between 100 and 90 degrees Baumé and of 0.600 to 0.650 specific gravity. By evaporating the solvent at low temperatures the exsudation of gum hydrocarbons together with the departing petroleum hydrocarbons is avoided and the evaporation is facilitated. This process results in new articles of manufacture, light-weight woods and paper boards and fibrous or felted substances impregnated with pure or mild-cured tenacious gum hydrocarbons without admixture of substances deleterious to the gum hydrocarbons and thereby of superior strength and tenacity and longer life, resistance to abrasion; wood thus treated retains its tenacity at the low temperatures at which iron turns brittle.

I claim:

1. The process of toughening wood and other fibrous substances which consist in impregnating the fibrous substances free of resinous and fatty and oily substances and starch with a solution, in a neutral volatile hydrocarbon menstruum such as volatile petroleum hydrocarbons, of tenacious gum hydrocarbons substantially free of resin; and then volatilizing the solvent from the fibrous substances at a temperature below that at which the gum hydrocarbons soften and then raising the temperature to the coalescing point of the gum hydrocarbons.

2. The new composition of matter which consist of fibrous substances free of resious and fatty and oily substances and starch and impregnated with tenacious gum hydrocarbons substantially free of resin.

3. The process of toughening wood and other fibrous substances and matters which consists in (1) impregnating the fibrous matter, free of resinous and fatty and oily substances and starch, with a solution, in a neutral volatile hydrocarbon menstruum of tenacious gum hydrocarbons substantially free of resin and mildly cured with a curing agent such as sulphur; and (2) volatilizing the hydrocarbon solvent from the fibrous matter at a temperature below that at which the gum hydrocarbons coalesce and then raising the temperature to the coalescing point of the cured gum hydrocarbons.

4. The new composition of matter which consist of wood and other fibrous matters free of resinous and fatty and oily substances and starch and impregnated with tenacious gum hydrocarbons substantially free of resin and mildly cured with a curing agent such as sulphur.

FELIX F. VON WILMOWSKY.